United States Patent [19]
Schubert

[11] Patent Number: 5,913,795
[45] Date of Patent: Jun. 22, 1999

[54] PACKAGING MACHINE

[75] Inventor: Gerhard Schubert, Crailsheim, Germany

[73] Assignee: Gerhard Schubert GmbH, Crailsheim, Germany

[21] Appl. No.: 08/895,690

[22] Filed: Jul. 17, 1997

[30] Foreign Application Priority Data

Jul. 31, 1996 [DE] Germany .......................... 196 30 964

[51] Int. Cl.⁶ .................................................. B65B 59/00
[52] U.S. Cl. ............................................. 53/201; 493/477
[58] Field of Search .................... 53/201, 167; 493/477, 493/478

[56] References Cited

U.S. PATENT DOCUMENTS

| | | | |
|---|---|---|---|
| 3,514,922 | 6/1970 | Cravens et al. ........................ | 53/201 X |
| 3,553,934 | 1/1971 | Johnson et al. ........................ | 53/201 X |
| 5,147,268 | 9/1992 | Cermeno ............................. | 493/477 X |
| 5,517,798 | 5/1996 | Klopfenstein ......................... | 53/201 X |
| 5,657,529 | 8/1997 | Bohn et al. .......................... | 493/477 X |

*Primary Examiner*—James F. Coan
*Attorney, Agent, or Firm*—Everson, McKeown, Edwards & Lenahan, PLLC

[57] ABSTRACT

A packaging machine of a modular construction designed in accordance with a respective specific task to be performed has a machine bed comprising first and second spaced-apart rows of hollow bed modules which are connected together in successive relationship in the longitudinal direction. The bed modules are held at a spacing by transverse struts.

15 Claims, 3 Drawing Sheets

PACKAGING MACHINE

FIELD OF THE INVENTION

The invention concerns a packaging machine, for example packaging individual products such as candies and the like. The packaging machine may be for example in the form of an entire packaging line for such purposes.

BACKGROUND OF THE INVENTION

A packaging machine as may occur for example in the form of an entire packaging line, in which for example chocolate candies or other individual products must be supplied individually and in an irregular or random manner by a manufacturing machine and then put into an intermediate package, whereupon the intermediate packages must then in turn be put for example into a carton or box for containing them may be required to perform a large number of individual tasks which may occur in different sequences, such as sorting, intermediate storage, transposition, transportation and so forth. For that reason, there may be a need for such a packaging machine, more especially in the form of a packaging line, to be of a variable structural configuration.

SUMMARY OF THE INVENTION

An object of the present invention is to provide a packaging machine which can be constructed in a modular configuration to perform a specific task to be effected thereby.

Another object of the present invention is to provide a packaging machine which affords an enhanced level of operational versatility in terms of structure and operating procedure.

Still another object of the present invention is to provide a packaging machine which can be quickly and easily adapted to varying operational requirements while affording the possibility of incorporating further items of equipment therein.

In accordance with the principles of the present invention the foregoing and other objects are attained by a packaging machine having a machine bed which comprises first and second spaced-apart rows of hollow bed modules which are connected together in succession in the longitudinal direction. The bed modules are held at a spacing by transverse struts.

As will be seen in greater detail from the following description of a preferred embodiment of the invention, such a design configuration for the machine bed of the packaging machine according to the invention can provide that the individual bed modules which are stable in themselves and which are preferably available in a few different dimensions, for example lengths, can be assembled to form machine beds of approximately any size, both in respect of extent in the longitudinal direction and also in the transverse direction, by using transverse struts of differing lengths. That also provides that production of the individual bed modules by a casting procedure and more especially a die casting procedure can be an efficient manner of manufacture.

The bed modules may preferably be box profile members of closed cross-section, which afford a particularly high level of torsional stiffness but which nonetheless for example may have fitting openings of large area on their outside, which openings are in practice closed by suitable covers, without the torsional stiffness of the box profile members suffering excessively as a result.

In a preferred feature of the invention the packaging machine rests on adjusting legs which are arranged exclusively in the transverse struts. By virtue of the adjusting legs of the machine bed, which are generally provided with a screwthread, being disposed exclusively in the transverse struts, that arrangement permits very simple assembly of the machine bed and adjustment thereof in the horizontal.

In a preferred feature of the invention the transverse struts may comprise perpendicularly disposed steel plates arranged in the lower region of the bed modules.

At the same time the interior of the bed modules affords sufficient space for arranging the most widely varying installation components for the packaging machine, for example electrical, pneumatic or possibly also hydraulic installation components and in particular electrical control systems, pneumatic pumps and the like.

For that purpose the two mutually parallel rows of bed modules are each open with a large area at the mutually oppositely directed contact surfaces, and preferably the contact surface comprises only the surrounding box profile of the bed module with bores arranged therein for screwing purposes. In particular the transverse struts which may comprise perpendicularly disposed steel strips or plates extend in between two bed modules which are arranged in a row with each other and they preferably extend as far as the outside edge of the respective row of bed modules. By virtue of that configuration, upon assembly, it is only necessary to make a screw connection of the respectively adjoining bed module, in relation to the perpendicularly disposed transverse strut, and not directly from one bed module to another.

In that respect, the perpendicularly disposed transverse strut is preferably arranged in the lower region of the bed module and preferably extends to not more than half and preferably about a third of the height of the bed module.

In the region of the individual bed modules, the upper edge of the perpendicularly disposed transverse struts also drops away inclinedly from the inside of the machine bed towards the outside edge thereof. That configuration provides that cables and other supply lines which extend along the row of bed modules within same and which rest on the inclined top edges of the transverse struts automatically slide outwardly of the machine bed on the inclined top edges of the transverse struts so that they then come to bear against the inside of the outer wall of the respective bed modules. As a result the inner wall of the bed modules remains freely available for disposing fixing means, in particular for installation items which are to be fixedly fitted in position such as electrical control boards, pumps and the like, without the risk of vibration which occurs in operation of the packaging machine causing the above-mentioned cables and other supply lines and installation lines to touch the sensitive components such as the electrical control boards, pumps and the like so as to damage them, and also without the cables and other supply lines and the like having to be secured in position individually by cable fixings and the like, which would involve a great deal of time.

By virtue of the fact that the perpendicularly disposed transverse struts occupy only approximately the lower third of the height of the box profiles, the free space thereabove, constituting about two thirds of the height of the bed modules, can be used, in the region between the first and second rows of bed modules, for further parts of the packaging machine and more especially for example for conveyor arrangements and the like which extend in the longitudinal direction of the packaging machine.

Besides the transverse struts which comprise perpendicularly disposed steel plates, the transverse struts may also be in the form of transverse tubular members which however preferably extend between the bed modules and which preferably do not project or project only slightly into the cross-section of the bed modules.

For that purpose, provided in the bed modules on the one inside side wall which is directed towards the opposite row of bed modules, in the end regions, are transverse openings which are adapted to the cross-sections of the transverse tube members which more particularly are preferably round. A transverse tube member of that kind can be fitted to or inserted into a respective such opening, for connection to the oppositely disposed opening in the other row of bed modules. If such an opening is not required it can be closed by means of a suitable cover.

In another design configuration which can be considered a hybrid design the transverse struts which are fixed by screw means between the individual bed modules are not made from steel plates which are disposed in a perpendicular position, but themselves in turn comprise hollow profiles and in particular hollow box profiles, while the interior of the hollow box profiles of the transverse struts provides a passage for various cables, supply lines, control lines and the like, from the left-hand row of bed modules to the right-hand row thereof.

The above-mentioned openings in the bed modules can also serve for the issue therefrom of cables and supply lines which lead from there to structural units of the packaging machine in the free space between the rows of bed modules, for example to sensors or motors on conveyor components and the like.

As robots are nowadays very frequently used in connection with packaging machines of this kind or entire packaging lines, such robots can be integrated in the optimum fashion into the packaging machine according to the invention, by various features as will now be discussed.

In the case of conventional robots which are used in particular as picker robots for picking up and transposing articles and products, the robot has a gripper arm which generally comprises an upper arm portion and a lower arm portion, wherein the upper arm portion is oriented more vertically and the lower arm portion is oriented more horizontally. Such robots have a relatively cantilevered reach in the gripping direction and are therefore generally arranged at a spacing beside the actual packaging machine.

In order to reduce the amount of ground space required in connection with the present packaging machine and in order not to have to widen the stable machine bed consisting of the bed modules, in the present case a type of robot is used in which firstly the upper arm is oriented substantially horizontally and the lower arm is oriented substantially vertically, and for that reason the upper arm is pivotally mounted to a tower-like robot housing which stands relatively high.

The robot housing is adapted in respect of its width, as considered in plan, to the width of the bed modules, while in respect of its extent in the longitudinal direction it is preferably matched to the length of one of the available bed modules.

By virtue of that configuration it is possible for the housing of the robot to be fitted into the row of bed modules in place of one of the bed modules, that is to say, it is screwed in place of one of the bed modules to the adjoining bed modules or to the transverse struts which are disposed therebetween.

In that way the robot is integrated into the machine bed in the optimum fashion, not only in terms of occupied surface area but also in respect of the degree of stiffness of the entire machine. The robot arm may be arranged laterally and at one side with respect to the tower-like robot housing, it may be disposed at a greater or lesser spacing therefrom, and it may operate selectively in the longitudinal direction or in the transverse direction of the packaging machine.

It is also possible for two robot housings to be arranged in side-by-side relationship and for a robot arm to be accommodated therebetween, by being mounted at two sides at the two robot housings which are arranged in succession in the longitudinal direction of a row of bed modules.

In that arrangement, the operating items which are extensive for such a robot, for example electrical controls, pneumatic equipment and in particular pneumatic valves, and so forth, may be readily disposed in the robot housings themselves and also in the adjacent bed modules.

A further problem is represented by the safety doors which are necessary on a packaging machine and which, during operation thereof, are intended to prevent a person from intervening in the packaging machine, due to the risk of injury that this entails.

As those safety doors must completely close off the entire periphery of the packaging machine, individually designed packaging machines always necessitated suitable adaptation or re-construction of the safety doors, which was an expensive procedure.

In the case of the present packaging machine according to the invention, provided in the top side of the bed modules, in the outwardly disposed corner regions, are openings for accommodating pivotal mountings for carrying the safety doors.

In that situation the pivotal mountings are again disposed in the interior of the bed modules and only the pivot axis or shaft which is mounted in the respective pivotal mounting and which extends substantially perpendicularly and on which a safety door for example in the form of an acrylic glass panel is arranged in such a way as to project laterally at one side extends through the opening in the top side of the bed module, to such a height out of same that it is not possible to gain access to the packaging machine over the safety doors which are fixed thereto.

In the pivotal mounting in the interior of the bed module, the rotational position of the pivot axes or shafts of the doors is detected by suitable devices, by way of sensors, and thus the safety door is locked, in particular by a positively locking interengagement, in the closed position thereof.

Preferably, each pivotal mounting has first and second pivot axes, the pivotal mounting preferably being installed in such a way that the two pivot axes are disposed in succession in the longitudinal direction. In that way, two successive safety doors can be operated and controlled by one pivotal mounting, more specifically, depending on the angle at which the safety door is fixed on the pivot axis, this may involve two safety doors which adjoin each other in the longitudinal direction or, if the pivotal mounting is at the end of a row of bed modules, two safety doors which are disposed at a right angle to each other.

Preferably in that respect the pivotal mountings are disposed in the interior of the bed modules in such close side-by-side relationship that on the one hand it is no longer possible for an operator to gain access to the interior of the packaging machine above the bed modules between the two pivot axes which project upwardly in side-by-side relationship, while on the other hand millings or bevels on the periphery of the pivot axes or sleeves which are non-rotatably fitted onto the pivot axes, within the box modules, permit the insertion of a locking pin between the two pivot axes of a pivotal mounting when the pivot axes are in the position for closed safety doors.

That arrangement means that the safety doors can be fixed in the closed position by a positively locking design configuration which preferably has a self-locking or irreversible effect.

Detecting whether the safety doors are in the closed position, something which is checked by the machine control system as the machine can be started only when all safety doors are in the closed position, is generally effected by way of an additional sensor at the pivotal mountings in the interior of the bed modules.

The sensor generally comprises a feeler device, preferably having a feeler roller at the front end of the feeler device, which is biased into the gap between the two adjacent pivot axes and which also cooperates with the millings or bevels provided there, in such a way that the feeler device can adopt a position of being moved further forwardly when the two pivot axes are in the position in which the safety doors are closed, while the feeler device is urged back into a different position as soon as the pivot axes are pivoted out of that position in which the safety doors are closed.

In addition, a pre-latching device may be provided for example at the lower end of the pivot axes, whereby the respective pivot axis latches into a stationary projection or the like, in the closed position of the safety door. In that case the safety doors can only be pivoted out of the closed position by actively withdrawing the sensing projection or by lifting the safety door prior to pivotal movement thereof. That prevents the safety doors from being accidentally pivoted open, even when the locking pins are withdrawn.

Further objects, features and advantages of the invention will be apparent from the following description of a preferred embodiment thereof.

DESCRIPTION OF THE PREFERRED EMBODIMENT

Figure 1:
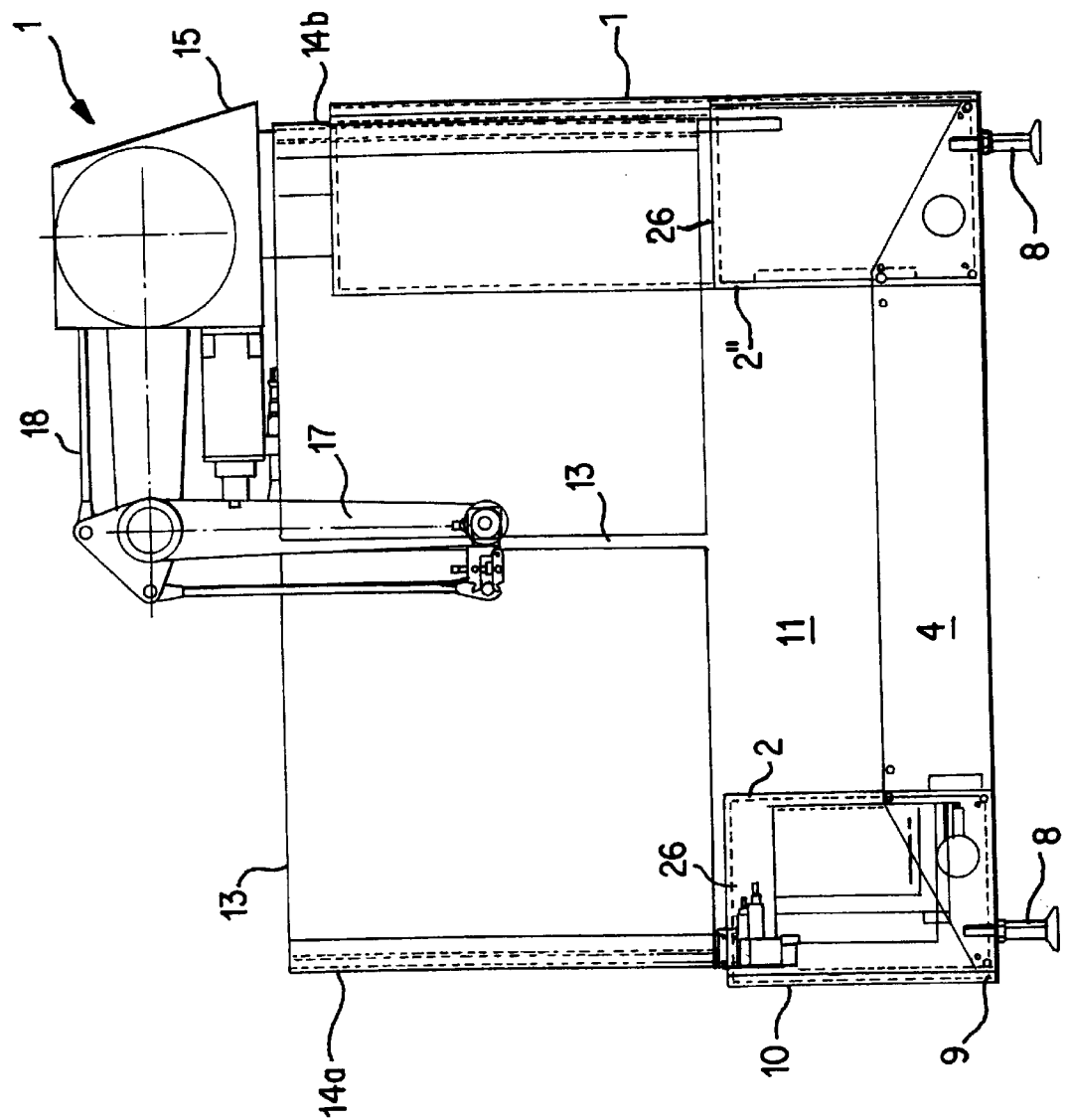
FIG. 1 shows a packaging machine as viewed in the longitudinal direction thereof.
Figure 2:
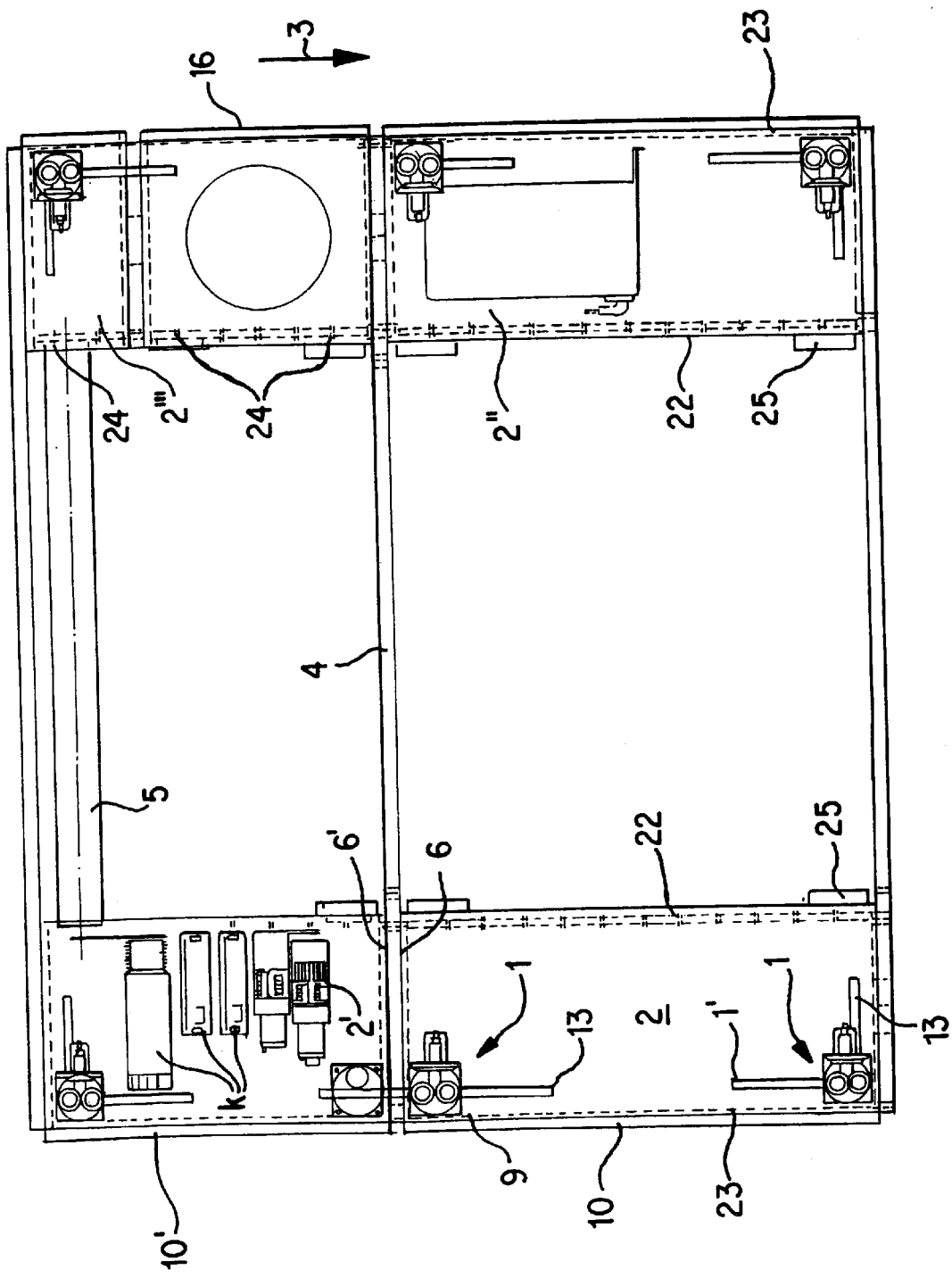
FIG. 2 is a plan view of the packaging machine shown in FIG. 1.

Referring to the front view in FIG. 1 and the plan view in FIG. 2 it will be seen that a packaging machine according to the invention has a machine bed comprising first and second spaced-apart rows A and B of hollow bed modules 2, 2' and 2", 2'" which are connected together and arranged in succession in the longitudinal direction 3 of the machine bed and which are held at a spacing in the transverse direction by way of transverse struts 4 which are secured in place by screw means between the modules. The transverse struts 4 comprise perpendicularly disposed flat iron members such as steel plates. The packaging machine rests on adjusting legs as indicated at 8 which are disposed exclusively in the plate-like transverse struts 4 and which provide for support and levelling of the machine with respect to the surface or ground on which it is standing. The adjusting legs 8 have a screwthread configuration to permit adjustment in respect of height of the entire machine bed and thus also setting thereof into a horizontal position or other desired position.

As can be seen from the view in FIG. 2, the bed of the packaging machine illustrated has bed modules of different lengths, but the height and width of the closed box profiles constituting the respective bed modules are always the same, as is clearly apparent from FIG. 1.

Looking at FIG. 2, the bed modules 2 through 2'" are open over a large surface area at contact surfaces 6, 6' and so forth, which are directed towards each other, and thus the respective bed modules only comprise the surrounding box profile, which is of a closed cross-section, of the bed module. Accordingly, items of installation equipment such as cables, supply lines, control conduits and the like can be laid in the bed modules 2 throughout the length thereof in the longitudinal direction 3 thereof.

The plate-like transverse struts 4 admittedly extend into positions between the bed modules 2 and 2' and as far as the outside edges thereof, but at the lower edge of the respective bed module the transverse struts extend upwardly only to a maximum as far as the middle of the height of the respective bed module 2, 2' and preferably only as far as a third of the height thereof. In addition, as can be seen from FIG. 1, the upper edge of each transverse strut 4, in the region in the interior of the respective bed module, 2, 2', extends inclinedly outwardly and downwardly to approximately the lower edge of the bed module 2, 2'.

It will be seen from FIG. 1 therefore that that design configuration of the upper edge of the transverse strut 4 forms a triangular opening within the respective bed module so that cables, supply lines and the like can also be passed through the opening which is of sufficient size for that purpose. The majority of cables, lines and the like however is laid on the top edge of the transverse struts 4 and under the effect of the force of gravity thereby slides along the inclined part of the top edge of the transverse struts 4 until encountering the outer side wall 23 of the respective bed modules 2 and 2'.

In addition the outer side walls 23 of the bed modules 2 through 2'" are open over a large surface area and essentially comprise only a peripherally extending frame. Those large openings are necessary for the purposes of accessibility when fitting items of equipment, supply lines and the like in the interior of the bed modules. The outer side walls 23 of the bed modules 2 through 2'" are closed by removable doors or covers as indicated at 10 which are suitably fitted thereto.

Disposed in the inner side walls 22 of the bed modules 2 through 2'" are transverse openings as indicated at 24 in FIG. 2 of preferably round configuration and preferably disposed in the lower third of the respective bed modules, in particular in the end regions as considered in the longitudinal direction of the bed modules. The transverse openings 24 can be universally employed, for a variety of different purposes, that is to say for example either for fitting a transverse tube member 5 therebetween, as shown in the upper region in FIG. 2, so that lines and the like can be taken through the transverse tube member 5 from one row A of bed modules to the other row B. The openings 24 however also provide a simple exit for cables, supply lines and the like into the central free space as indicated at 11 in FIG. 1 in the middle of the packaging machine, as well as the conveyor belts, accumulation chains and the like which are arranged therein, in which case the transverse openings 24 are closed by suitable inside covers 25 which preferably comprise plastic material and individual bores can be suitably provided for the respective cables which are to be passed therethrough.

A further possible form of use of the transverse openings 24 involves the installation of switch gear fans if the items of equipment disposed in the interior of the respective bed module 2 or 2", for example and more particularly electrical controls and circuits, require positive ventilation of that kind.

Figure 4:
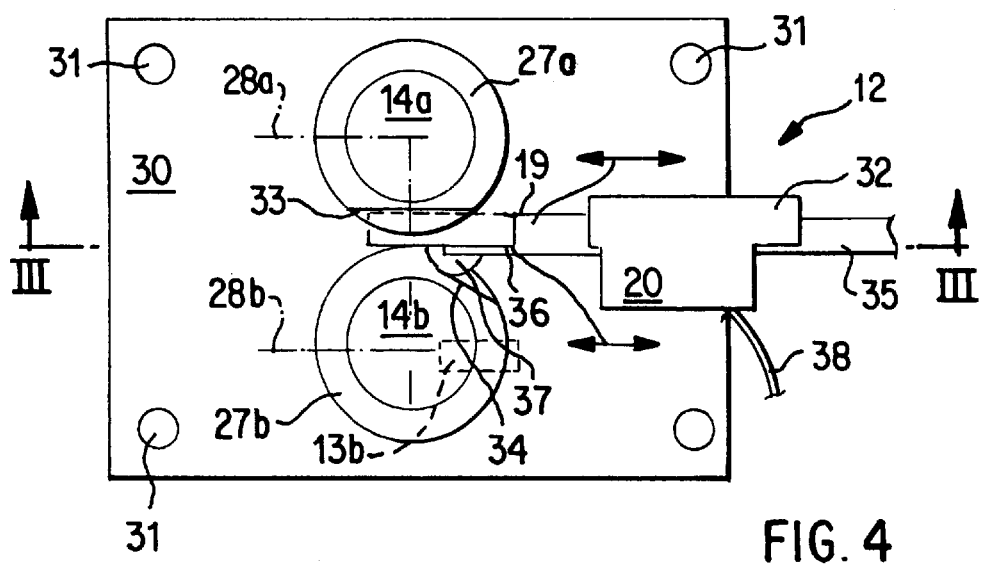
FIG. 4 is a plan view of the structure shown in FIG. 3.

Upper openings, preferably of a round contour, are again disposed in the top side as indicated at 26 in FIG. 1 of the respective bed modules 2 through 2''', and pivotal mountings as indicated at 12 in FIG. 4 can be fitted in the above-mentioned openings in the top side 26, for supporting safety doors as indicated at 13 in FIG. 1.

The safety doors 13 enclose the whole of the outer edge of the packaging machine insofar as a safety door 13 closely adjoins the next safety door, more specifically both at the longitudinal sides of the packaging machine and also at the transverse sides at the beginning and the end of the machine.

For reasons of clarity of the drawing, the plan view in FIG. 2 shows the safety doors 13 only in diagrammatic form and thus as being of reduced length. In actual practice however, as will be readily appreciated, the safety doors 13 for example which are directed towards each other at the lower left bed module 2 in FIG. 2 extend with their free ends until almost being in contact with each other.

A pivotal mounting 12 as referred to above will be described in greater detail hereinafter with reference to FIGS. 3 and 4.

Looking still at FIG. 1, a robot 15 is integrated into the row B of bed modules 2. The robot 15 has a robot head 15a which is rotatable about a vertical axis with respect to the robot housing which is shown therebeneath in FIG. 1 and which is indicated at 16 in FIG. 2. A substantially horizontally extending robot upper arm 18 is fixed to the robot head 15a pivotably about a horizontal axis. A substantially vertically extending robot lower arm 17 is in turn arranged at the free end of the upper arm 18 pivotably about a horizontal axis. Tools which are suited to the specific packaging task to be performed such as grippers, suckers or the like devices are arranged at the free end of the lower arm 17.

It will be noted that the above-described orientation of the arms of the robot, in which the upper arm 18 is disposed at least substantially horizontally and the lower arm 17 is disposed at least substantially vertically, being therefore precisely the opposite to the usual design of robot arm, minimises the degree of lateral cantilevering.

In the illustrated construction the robot housing 16 is of a tall narrow configuration, of a tower-like nature, of a width corresponding to the width of the bed modules 2" and 2''', but substantially higher. The robot housing 16 is also a box profile which is closed as considered from above, with a large-area opening on the outside and the top side, together with transverse openings 24 at the inside. The robot housing 16 is thus fitted in the same way as a bed module 2 into the row B between adjacent bed modules with transverse struts 4 and screwed to the latter, and therefore extends down to the lower edge of the row B of bed modules and does not project laterally with respect to the latter.

Instead of the movement of the upper arm 18 and the lower arm 17 of the robot 15 being produced by parallelogram-like lever configurations, as shown in FIG. 1, the pivotal movement can also be produced directly by means of pneumatic cylinders.

Figure 3:
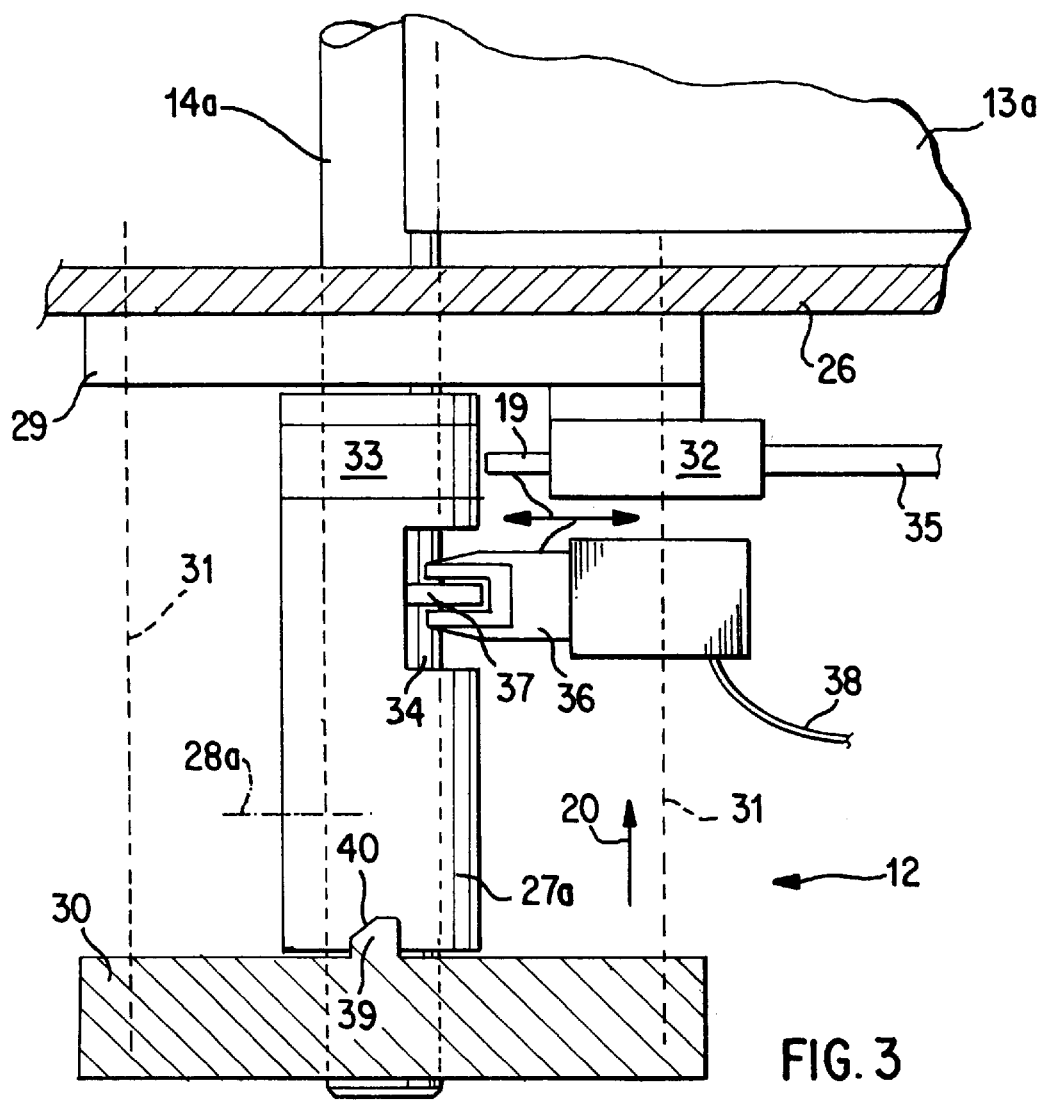
FIG. 3 is a detail view of a pivotal mounting.

Reference will now be made to FIGS. 3 and 4 showing a side view and a plan view in detail of a pivotal mounting 12 for the respective safety doors 13.

With reference now to FIG. 4 reference numeral 19 in the upper part thereof shows a locking pin adapted to co-operate with an associated milled opening or recess 33 while reference numeral 36 in the lower part of FIG. 4 shows a sensing head 36 adapted to co-operate with a milled opening or recess 34; it will however be appreciated that the millings 33 and 34 are provided on two sleeves 27a and 27b which are disposed in mutually superposed relationship, as shown in FIG. 3. The locking pin 19 and the sensing head 36 with sensing roller 37 carried thereby are designed symmetrically with respect to a central plane between pivot axes as indicated at 14a and 14b for the respective safety doors 13.

The pivotal mounting 12 is preferably disposed between an upper plate which can be clearly seen at 29 in FIG. 3 and a lower plate indicated at 30 in FIG. 3. The upper and lower plates 29 and 30 are held together by vertically extending screw means as indicated at 31 in FIG. 3 and also shown in the form of round holes at 31 in FIG. 4, preferably extending at the four corners of the rectangular plates 29 and 30. The plates 29 and 30 are fixed in the interior of the bed module 2, namely beneath the top side thereof as indicated at 26.

In this arrangement the two pivot axes 14a and 14b which project upwardly out of the top side 26 of the bed module 4 and into each of which the safety doors 13 can fitted into a groove and fixed therein in laterally projecting relationship extend downwardly into the pivotal mounting 12 and thus into the interior of the bed module 2.

At that location, on the one hand the locking pin 19 and on the other hand the sensing roller 37 are disposed in mutually superposed relationship movably transversely with respect to the direction of pivot axes 14a and 14b and pointing towards the gap between the pivot axes 14a and 14b. The locking pin 19 and the roller 37 co-operate with corresponding millings 33 and 34 at the peripheries of the pivot axes 14a and 14b.

For reasons of greater ease of manufacture however, the millings 33 and 34 are not provided in the outside periphery of the pivot axes 14a and 14b themselves, but in the outside periphery of sleeves 27a and 27b which are fitted with a precise fit onto the pivot axes 14a and 14b in the region of the pivotal mounting 12, that is to say preferably in region between the upper plate 29 and the lower plate 30. The sleeves 27a and 27b are secured to prevent relative rotational movement with respect to the pivot axes 14a and 14b by means of transverse screws as indicated at 28a and 28b.

As noted above, tangential millings 33 are provided on the sleeves 27a and 27b for the locking pin 19, the surfaces of the millings extending in mutually opposite relationship and parallel to each other when the pivot axes 14a and 14b are in the closed position of the safety doors 13a and 13b.

The locking pin 19 is of a width corresponding to the spacing of the millings 33 so that the locking pin 19 which is connected to the piston rod of a pneumatic piston-cylinder unit indicated at 32 which is supplied with compressed air by way of a pneumatic hose 35 can be pushed into the gap between the millings 33 on the sleeves 27a and 27b. The locking arrangement is self-locking in that position, that is to say, the locking pin 19 cannot be pushed out of the gap between the sleeves 27a and 27b by rotary movement of the sleeves, if the locking pin 19 reaches or goes beyond the connecting line between the centers of the pivot axes 14a and 14b.

Preferably at a location which is vertically displaced with respect to the millings 33, a sensor co-operates with the sleeves 27a and 27b. The sensor also faces towards the gap between the sleeves 27a and 27b and includes a sensing head 36 which is movable in that transverse direction and which carries a sensing roller 37 at its front free end. The sensing head 36 is preferably stressed by means of spring force towards the sleeves 27a and 27b so that the sensing roller 37 bears against the outside periphery thereof.

Provided in that region in respect of height on the sleeves 27a and 27b, for the sensing roller 37, are millings 34 which, as viewed in the plan view of FIG. 4 over the two sleeves 27a, 27b, provide a V-shaped contour with a rounding radius in the bottom of the V-shape, that is equal to or larger than the radius of the sensing roller 37.

The sides of the V-shape however do not extend precisely tangentially relative to the center of the sleeve 27a or 27b respectively but from the bottom of the V-shape towards the free ends thereof, increasingly move away from the center points of the sleeves 27a, 27b.

When therefore the sleeves 27a, 27b are in the closed position of the safety doors 13 secured thereto, the millings 34 then form the V-shape of which half is shown in FIG. 4, and the sensing roller 37 bears against the V-contour in the bottom thereof, by virtue of the prestressing force applied to the sensing roller 37. In that case the sensing head 36 of the sensor 20 is disposed in its forwardly displaced position and transmits a signal indicting both safety doors closed to the control system of the packaging machine, by way of a cable 38.

As soon as one of the safety doors 13 of the pivotal mounting 12 illustrated is opened however, the associated sleeve 27a or 27b is pivoted.

If in that situation attention is directed for example to the sleeve 27b in FIG. 4, a pivotal movement in the clockwise direction causes the sensing roller 37 and therewith the sensing head 36 to be pushed back into the sensor 20 as the one half of the bottom of the V-shape urges the sensing roller 37 back towards the right in FIG. 4.

If the sleeve 27b is pivoted in the counter-clockwise direction, the sensing roller 37 is also pushed back towards the sensor 20, by virtue of the side of the milling 34, which does not extend tangentially but which extends inclinedly outwardly. That configuration of the milling 34 also seeks primarily to urge the sensing head 36 towards the middle between the two pivot axes 14a and 14b and as a result, because of the wedge or taper action, also urges it towards the sensor 20.

In practice, the packaging machine can be started only when the sensors 20 of all pivotal mountings 12 of the packaging machine signal that all safety doors 13 are in the closed positions and consequently all safety doors 13 are secured in that position by means of appropriate locking pins 19.

An additional securing arrangement is arranged at the lower end of the sleeves 27a and 27b, as will now be described.

At that location, projecting from the bottom plate 30 in an upward direction is a projection 39 which is of a bevelled configuration, as can be clearly seen from FIG. 3. In the closed position of the safety doors 13, the projection 39 engages into a corresponding recess 40 in the respective sleeve 27a or 27b.

To open a safety door therefore it is firstly necessary to lift the safety door in order to withdraw the projection 39 from the recess 40. The millings 33 and 34 on the sleeves 27a and 27b must also be longer in a vertical direction than the height of the respectively associated locking pins 19 and sensing heads 36, by a dimension corresponding to that upward movement of the safety door for disengaging the projection 39 from the recess 40, in order to permit such disengagement to occur.

It will be appreciated that the above-described structures have been set forth solely by way of example and illustration of the principles of the present invention and that various modifications and alterations may be made therein without thereby departing from the spirit and scope of the invention.

What is claimed is:

1. A packaging machine including a machine bed comprising:

first and second spaced-apart rows of hollow bed modules, means connecting the bed modules together in succession in the longitudinal direction of the machine bed, and transverse spacer members adapted to hold the rows of hollow bed modules at a spacing from each other, wherein said transverse spacer members are perpendicularly disposed flat members arranged in the lower regions of the respective bed modules.

2. A packaging machine as set forth in claim 1 wherein said transverse spacer members are struts.

3. A packaging machine as set forth in claim 1 and further comprising a free space between the first and second rows of bed modules and, in said free space and above said transverse spacer members, other parts of the packaging machine extending in the longitudinal direction thereof.

4. A packaging machine as set forth in claim 1 and further comprising adjusting legs, arranged exclusively on the transverse spacer members, for supporting the packaging machine.

5. A packaging machine as set forth in claim 3 wherein said other parts of the packaging machine include conveyor belts and transport chains.

6. A packaging machine including a machine bed comprising:

first and second spaced-apart rows of hollow bed modules, means connecting the bed modules together in succession in the longitudinal direction of the machine bed, and transverse spacer members adapted to hold the rows of hollow bed modules at a spacing from each other, wherein each bed module is a box profile of closed cross-section, with at least one large-area mounting opening on at least one side surface, and further including a cover means for covering the mounting opening.

7. A packaging machine as set forth in claim 6 wherein said side surface is an outer side surface of the respective bed module.

8. A packaging machine including a machine bed comprising:

first and second spaced-apart rows of hollow bed modules, means connecting the bed modules together in succession in the longitudinal direction of the machine bed, and transverse spacer members adapted to hold the rows of hollow bed modules at a spacing from each other, wherein the transverse spacer members are perpendicularly disposed flat members and extend in between the bed modules, and wherein the bed modules have mutually oppositely directed contact surfaces, and further including screw means for screwing the bed modules to the mutually oppositely directed contact surfaces of a respective pair of successively arranged bed modules.

9. A packaging machine as set forth in claim 8 wherein at said mutually oppositely directed contact surfaces the bed modules have passage openings for accommodating installation components in the bed modules.

10. A packaging machine as set forth in claim 9 wherein said installation components include electric cables and supply lines and electrical and optionally pneumatic control components.

11. A packaging machine including a machine bed comprising:

first and second spaced-apart rows of hollow bed modules, means connecting the bed modules together in succession in the longitudinal direction of the machine bed, transverse spacer members adapted to hold the rows of hollow bed modules at a spacing from each other, and a respective pivotal mounting for at least one respective axis of a safety door of the packaging machine in a region of outer corners of the bed modules.

12. A packaging machine as set forth in claim 11 wherein each said pivotal mounting has first and second pivot axes for first and second safety doors at a spacing in said longitudinal direction.

13. A packaging machine as set forth in claim 12 wherein said first and second pivot axes are of a round cross-section and in the region of said pivotal mounting have mutually oppositely directed milling means, and further including a locking pin which is common to said milling means and which is adapted to engage transversely between said pivot axes thereby to provide a positively locking pivotal locking effect for said pivot axes to secure said safety doors in a locked position.

14. A packaging machine including a machine bed comprising:

first and second spaced-apart rows of hollow bed modules, means connecting the bed modules together in succession in the longitudinal direction of the machine bed, transverse spacer members adapted to hold the rows of hollow bed modules at a spacing from each other, at least one robot having a robot housing arranged in at least one of the rows between successive bed modules, and means fixedly connecting said robot housing to said successive bed modules.

15. A packaging machine as set forth in claim 14 wherein said robot housing is of a tower-like configuration.

* * * * *